J. M. DODGE.
PROCESS OF MAKING CHAIN LINKS.
APPLICATION FILED JULY 19, 1913. RENEWED JUNE 12, 1914.
1,125,275.  Patented Jan. 19, 1915.
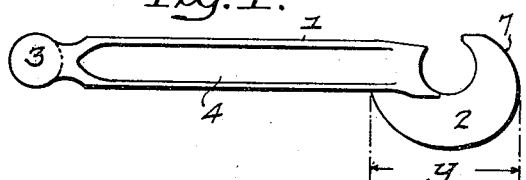
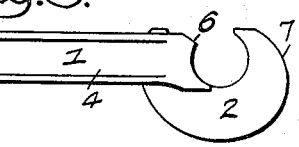
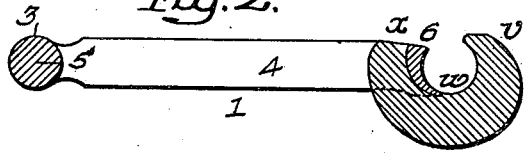
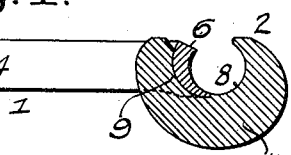
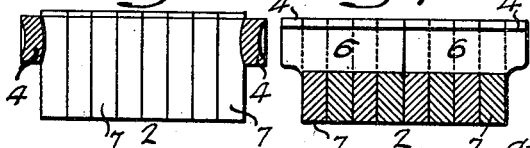
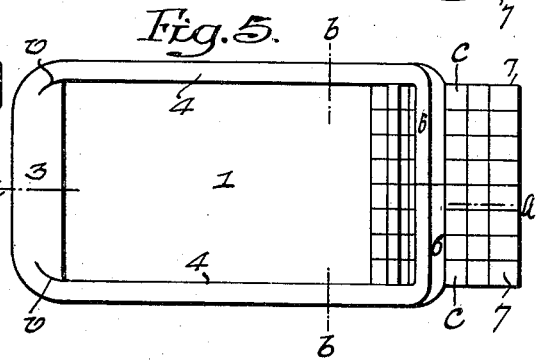
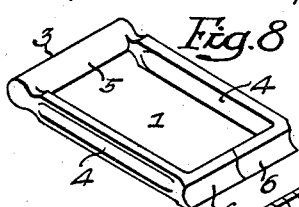
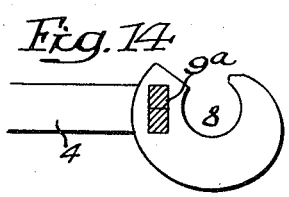
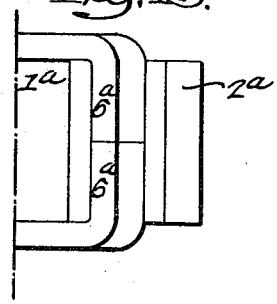
Witnesses-
Inventor-
James M. Dodge.
by his Attorneysized

# UNITED STATES PATENT OFFICE.

JAMES M. DODGE, OF PHILADELPHIA, PENNSYLVANIA.

PROCESS OF MAKING CHAIN-LINKS.

1,125,275.

Specification of Letters Patent.

Patented Jan. 19, 1915.

Application filed July 19, 1913, Serial No. 779,967. Renewed June 12, 1914. Serial No. 844,790.

*To all whom it may concern:*

Be it known that I, JAMES M. DODGE, a citizen of the United States, residing in Philadelphia, Pennsylvania, have invented certain Improvements in the Process of Making Chain-Links, of which the following is a specification.

My invention relates to certain improvements in the process of manufacturing a chain link of the detachable type having an open rectangular body which is provided with a hook at one end by which it can be detachably connected to the end bar of an adjoining link.

The object of my invention is to improve the process of manufacturing a link of this type, whereby the link can be made from blanks punched from wrought metal plates, thus increasing the strength and reducing the cost of manufacturing links of this type as compared with the cost of producing cast malleable iron links of the same type and size.

In the accompanying drawings: Figure 1 is a side view of a link made in accordance with my invention; Fig. 2 is a longitudinal sectional view of the link; Fig. 3 is a side view showing the body portion and the hook assembled before welding; Fig. 4 is a longitudinal sectional view on the line *a—a*, Fig. 5; Fig. 5 is a plan view of the parts assembled before welding; Fig. 6 is a transverse sectional view on the line *b—b*, Fig. 5; Fig. 7 is a transverse sectional view on the line *c—c*, Fig. 5; Fig. 8 is a detached perspective view of the body portion of the link; Fig. 9 is a detached perspective view of the hook portion of the link, showing the blanks assembled; Fig. 10 is a view of one of the blanks of the hook section; Figs. 11 and 12 are views of the blank and the body portion; Fig. 13 is a sectional view illustrating a modification of the invention; and Figs. 14 and 15 are views illustrating a modification of the method of assembling the elements to form the links.

In carrying out my improved process, I form the body portion 1 by first making the blank, as illustrated in Fig. 11, having a section 3 which is of a greater width than the balance of the blank and this section forms the round end bar, as illustrated in Fig. 2. The ends of the portion 3 are beveled, as shown in Figs. 11 and 12, so that, when they are bent into the form illustrated in Figs. 4 and 5, they form diagonal abutments *v* over which the side bars 4 are bent. The slot 5 is on the inside of the bar so that, as the bar wears, it can be reduced to a considerable extent without materially weakening the link. The side bars 4 are shaped as shown in Fig. 6, and have a convexed inner surface and a concaved outer surface. This construction not only stiffens the bars, but also provides a tapered opening for the sprocket teeth to enter the link. The ends 6 of the blank are bent toward each other, as shown in Fig. 5, preferably with their ends abutting. These end members 6 are shaped as shown in Figs. 4 and 8, being curved and tapered in cross section and extend below the side bars of the link. The ends of the blank from which the body portion is made are wider than the portion forming the side bars, as shown in Fig. 11. By this construction the end bars are thin but substantial so that when located in the hook sections they form the rear of the socket and make it unnecessary to increase the thickness of the hook section, which is the same as that of the standard cast malleable link.

The hook member 2 is preferably made of a series of elements 7, Fig. 10, each having a socket 8 and a recess 9 directly back of the socket and communicating therewith. This recess is shaped to conform to the end member 6 of the body portion so that when the elements 7 are assembled side by side, as in Fig. 9, the end members 6 of the body portion can be located therein. The rear portion of the hook member will extend above the longitudinal center line of the body portion of the link so as to reinforce the end member of the body portion.

The elements 7 are punched from a sheet of metal and as the body portion is also made from sheet metal, the entire link is thus made from sheet metal and casting is dispensed with.

It will be noticed upon referring to Fig. 4 that the rear of the hook member extends above the body portion and is beveled so as to form a recess between the rear of the hook member and the end bars 6. This enables the weld to be extended to a greater distance than if the parts were fitted closely and the excess metal is used in the welding as the height is reduced as in Fig. 2.

When the end members 6 of the body portion 1 are located in the recess 9, as indicated in Figs. 1 and 3, the parts are united by welding, preferably at the points $w$, $x$ and $v$, Fig. 2, by the use of an acetylene or other flame, which is passed across the hook member so that the elements of the hook member are secured together and to the end members of the body portion, making a unitary structure.

In some instances, instead of making the hook member of a series of elements, as in Fig. 8, they may be made of a single element, as in Fig. 13. The blank may be formed by drawing a bar into the desired shape and cutting off the elements and securing them to the hook member by welding.

Thus it will be seen that I am enabled to make a chain link entirely of wrought metal by first forming punched blanks from wrought metal plates and then bending the blank, which forms the body portion, to the proper shape and assembling the series of blanks to form the hook member with the body portion and uniting the body portion to the hook member by welding.

In Figs. 14 and 15, I have illustrated an element in which there is a rectangular opening $9^a$ instead of the recess which communicates with the socket 8. The end members $6^a$ are tapered and one member overlaps the other in the recess. The parts are welded together by an acetylene flame, but the weld is not so perfect as the weld when the parts are made as in Fig. 5. In both of these instances, the end bars may be made thin and wide so as to reduce the length of the hook member, as indicated at $y$, Fig. 1, the length being the same as that of the ordinary malleable iron link of the standard type, so that one link will interchange with the other. By making the end members thin and wide, I do not reduce the strength, but am enabled to make the hook member within the prescribed limits.

I claim:

1. The process herein described of making a chain link, said process consisting in first making a quadrangular body section having a thin and wide end member; a hook section having a socket and a recess back of the socket, mounting the end member of the body section in the recess of the hook portion so that the hook portion will extend past the longitudinal center line of the body section in order to reinforce the end member of the body section, then securing the two parts by welding without increasing the width of the hook section so that the completed link will be interchangeable with the standard malleable metal link of the same type.

2. The process herein described of making a chain link, said process consisting in forming a body section from a blank, then forming a hook section from a series of punched elements, each element having a socket and a recess back of the socket, assembling the elements side by side to form a hook section of the proper width and finally uniting the hook section to the body section.

3. The process herein described of making a chain link, said process consisting of bending a blank to form an open quadrangular section, then punching a series of elements, each having a socket and a recess back of the socket, assembling the elements side by side to form a hook section and uniting the hook section to the quadrangular body section.

4. The process herein described of manufacturing a detachable chain link, said process consisting in bending a blank to form an open quadrangular section with the ends abutting to form an end member, making a series of blanks having a socket and a recess directly back of the socket and communicating therewith, assembling a series of these elements so as to form a hook member, locating the end member of the body portion formed by the two ends of the blank in the recess of the hook section, uniting the said bar to the individual members of the hook section by welding, and also connecting the several elements of the hook section by welding.

In testimony whereof, I have signed my name to this specification, in the presence of two subscribing witnesses.

JAMES M. DODGE.

Witnesses:
Wm. E. Shupe,
Wm. A. Barr.